(12) United States Patent
Mann et al.

(10) Patent No.: US 8,048,186 B2
(45) Date of Patent: Nov. 1, 2011

(54) FILTER RETENTION SYSTEMS AND DEVICES

(75) Inventors: Richard Michael Ashley Mann, Berkshire (GB); Christina Goodrick Meech, Hampshire (GB)

(73) Assignee: General Electric Company, Schenectady, NY (US)

( * ) Notice: Subject to any disclaimer, the term of this patent is extended or adjusted under 35 U.S.C. 154(b) by 447 days.

(21) Appl. No.: 12/417,471

(22) Filed: Apr. 2, 2009

(65) Prior Publication Data

US 2010/0251678 A1    Oct. 7, 2010

(51) Int. Cl.
*B01D 59/50* (2006.01)
(52) U.S. Cl. .............. 55/483; 55/484; 55/493; 55/495; 55/496; 55/501; 55/502; 55/507; 55/511; 55/490; 55/DIG. 31
(58) Field of Classification Search ........... 55/483, 55/484, 493, 495, 496, 501, 502, 507, 511, 55/490, DIG. 31
See application file for complete search history.

(56) References Cited

U.S. PATENT DOCUMENTS

| | | | |
|---|---|---|---|
| 1,953,156 A * | 4/1934 | Verner Dahlman | 55/502 |
| 2,792,906 A * | 5/1957 | Evans | 55/502 |
| 3,093,401 A | 6/1963 | Hagendoorn | |
| 3,360,910 A * | 1/1968 | Soltis | 55/483 |
| 3,423,908 A * | 1/1969 | Hart | 55/481 |
| 3,432,999 A | 3/1969 | Schraner | |
| 3,487,768 A | 1/1970 | Watson | |
| 3,552,704 A | 1/1971 | Pond | |
| 3,576,096 A | 4/1971 | Rivers | |
| 3,733,793 A | 5/1973 | Young | |
| 3,740,934 A | 6/1973 | Shuler | |
| 3,750,374 A * | 8/1973 | Neumann | 55/484 |
| 3,759,017 A | 9/1973 | Young | |
| 3,774,946 A | 11/1973 | Hammann | |
| 3,837,149 A | 9/1974 | West et al. | |
| 3,859,965 A | 1/1975 | Hatz et al. | |
| 3,860,273 A | 1/1975 | Petrus | |
| 3,891,253 A | 6/1975 | Revell | |
| 3,916,817 A | 11/1975 | Kemp | |
| 3,926,155 A | 12/1975 | Hatz et al. | |
| 3,949,356 A | 4/1976 | Fuzzell et al. | |
| 3,966,163 A | 6/1976 | Getzin | |
| 3,993,464 A * | 11/1976 | Pelabon | 55/480 |
| 3,999,969 A | 12/1976 | Shuler | |
| 4,061,373 A | 12/1977 | Revell | |

(Continued)

FOREIGN PATENT DOCUMENTS

CA        1148874 A1    6/1983

(Continued)

OTHER PUBLICATIONS

U.S. Appl. No. 12/363,682, filed Jan. 30, 2009, Mann et al.

(Continued)

*Primary Examiner* — Jason M Greene
*Assistant Examiner* — Dung H Bui
(74) *Attorney, Agent, or Firm* — Fletcher Yoder (57) ABSTRACT

A system, in certain embodiments, includes a filter holding frame configured to support a plurality of filters for a turbine engine. The filter holding frame has a first filter cell and a first retainer. The first retainer has a first retaining pad coupled to a first shaft, wherein the first retaining pad and the first shaft are movable to secure and release a first filter in the first filter cell.

26 Claims, 8 Drawing Sheets

U.S. PATENT DOCUMENTS

| | | |
|---|---|---|
| 4,171,211 A | 10/1979 | Carter |
| 4,178,159 A * | 12/1979 | Fecteau ........................ 55/385.3 |
| 4,193,844 A * | 3/1980 | Neumann et al. ............... 55/309 |
| 4,217,122 A | 8/1980 | Shuler |
| 4,224,765 A | 9/1980 | Song |
| 4,266,956 A | 5/1981 | Revell |
| 4,276,069 A | 6/1981 | Miller |
| 4,323,379 A | 4/1982 | Shearin |
| 4,472,184 A | 9/1984 | Neumann et al. |
| 4,488,888 A | 12/1984 | Doyle |
| 4,497,287 A | 2/1985 | Schleiermacher et al. |
| 4,498,914 A | 2/1985 | Ericksen |
| 4,519,823 A * | 5/1985 | Kinney et al. ................... 55/493 |
| 4,521,234 A * | 6/1985 | Peebles et al. .................. 55/481 |
| 4,555,255 A * | 11/1985 | Kissel ............................ 55/355 |
| 4,569,803 A | 2/1986 | Takakura et al. |
| 4,600,419 A * | 7/1986 | Mattison ........................ 55/484 |
| 4,608,066 A * | 8/1986 | Cadwell, Jr. .................. 55/385.1 |
| 4,632,681 A * | 12/1986 | Brunner ......................... 55/493 |
| 4,648,311 A | 3/1987 | Slosiarek et al. |
| 4,701,196 A | 10/1987 | Delaney |
| 4,707,168 A | 11/1987 | Mizutani |
| 4,710,208 A * | 12/1987 | Ziemer et al. ................... 55/355 |
| 4,808,203 A * | 2/1989 | Sabourin ........................ 55/492 |
| 4,846,859 A * | 7/1989 | Nobiraki et al. ................ 96/384 |
| 4,860,420 A * | 8/1989 | Cadwell et al. ............ 29/890.14 |
| 4,889,543 A | 12/1989 | Burt |
| 4,909,208 A | 3/1990 | Krisztics |
| 4,944,142 A | 7/1990 | Sueshig et al. |
| 4,946,484 A * | 8/1990 | Monson et al. ............... 55/385.2 |
| 4,976,757 A * | 12/1990 | Helmus .......................... 55/355 |
| 4,978,375 A * | 12/1990 | Il Yoo ........................... 55/493 |
| 4,986,050 A | 1/1991 | Brunetti et al. |
| 5,003,974 A | 4/1991 | Mou |
| 5,014,608 A * | 5/1991 | Benson et al. ................. 454/187 |
| 5,056,423 A | 10/1991 | Koukal et al. |
| 5,062,872 A | 11/1991 | Williams |
| 5,071,456 A | 12/1991 | Binder et al. |
| 5,088,299 A | 2/1992 | Peterson |
| 5,099,374 A | 3/1992 | Ohkita et al. |
| 5,160,293 A | 11/1992 | Koukal et al. |
| 5,167,683 A | 12/1992 | Behrendt et al. |
| 5,273,564 A | 12/1993 | Hill |
| 5,279,632 A * | 1/1994 | Decker et al. ................... 55/355 |
| 5,286,201 A | 2/1994 | Yu |
| 5,291,355 A | 3/1994 | Hatch et al. |
| 5,295,602 A | 3/1994 | Swanson |
| 5,313,759 A | 5/1994 | Chase, III |
| 5,331,748 A | 7/1994 | Miller, Jr. |
| 5,332,409 A * | 7/1994 | Dralle ........................... 55/484 |
| 5,379,609 A | 1/1995 | Matsumoto et al. |
| 5,417,205 A | 5/1995 | Wang |
| 5,417,610 A * | 5/1995 | Spransy ........................ 454/187 |
| 5,421,307 A | 6/1995 | Andress et al. |
| 5,422,795 A | 6/1995 | Liu |
| 5,454,756 A * | 10/1995 | Ludwig ......................... 454/296 |
| 5,458,772 A * | 10/1995 | Eskes et al. .................... 210/238 |
| 5,512,074 A * | 4/1996 | Hanni et al. ................... 55/484 |
| 5,512,086 A | 4/1996 | Glucksman |
| 5,514,197 A * | 5/1996 | Den ............................... 55/405 |
| 5,554,203 A * | 9/1996 | Borkent et al. ................ 55/378 |
| 5,575,826 A * | 11/1996 | Gillingham et al. ............ 55/284 |
| 5,601,626 A * | 2/1997 | Hori et al. ...................... 55/493 |
| 5,602,700 A | 2/1997 | Viskochil et al. |
| 5,617,825 A | 4/1997 | Altmann et al. |
| 5,637,124 A * | 6/1997 | Diachuk ........................ 55/342 |
| 5,655,825 A | 8/1997 | Anoszko |
| 5,669,947 A * | 9/1997 | Diachuk ........................ 55/342 |
| 5,725,624 A | 3/1998 | Ernst et al. |
| 5,733,348 A * | 3/1998 | Skarsten ........................ 55/385.2 |
| 5,753,002 A | 5/1998 | Glucksman |
| 5,759,239 A | 6/1998 | Yu |
| 5,788,729 A * | 8/1998 | Jurgensmeyer ................ 55/496 |
| 5,797,975 A * | 8/1998 | Davis ........................... 55/493 |
| 5,820,235 A | 10/1998 | Tsai |
| 5,824,125 A * | 10/1998 | Sherwood ..................... 55/379 |
| 5,833,727 A | 11/1998 | Sharsten |
| 5,871,556 A * | 2/1999 | Jeanseau et al. .............. 55/385.2 |
| 5,904,744 A | 5/1999 | Kagan |
| 5,984,991 A | 11/1999 | Glucksman |
| 6,001,145 A | 12/1999 | Hammes |
| 6,099,612 A * | 8/2000 | Bartos ........................... 55/481 |
| 6,117,202 A * | 9/2000 | Wetzel ......................... 55/385.2 |
| 6,149,701 A * | 11/2000 | Ellingson ...................... 55/493 |
| 6,152,980 A | 11/2000 | Culwell |
| 6,190,431 B1 * | 2/2001 | Jeanseau et al. .............. 55/385.2 |
| 6,264,713 B1 * | 7/2001 | Lewis, II ....................... 55/481 |
| 6,267,793 B1 | 7/2001 | Gomez et al. |
| 6,270,546 B1 * | 8/2001 | Jeanseau et al. .............. 55/385.2 |
| 6,293,983 B1 * | 9/2001 | More ............................. 55/486 |
| 6,309,296 B1 | 10/2001 | Schwenk et al. |
| 6,312,327 B1 | 11/2001 | Hachmann et al. |
| 6,319,300 B1 | 11/2001 | Chen |
| 6,337,782 B1 | 1/2002 | Guerin et al. |
| 6,339,521 B1 | 1/2002 | Durrum et al. |
| 6,351,920 B1 * | 3/2002 | Hopkins et al. ............. 52/506.08 |
| 6,361,578 B1 * | 3/2002 | Rubinson ...................... 55/487 |
| 6,362,937 B1 | 3/2002 | Gibbs et al. |
| 6,371,846 B1 | 4/2002 | Powell et al. |
| 6,447,566 B1 * | 9/2002 | Rivera et al. .................. 55/482 |
| 6,451,079 B1 * | 9/2002 | Lange et al. ................... 55/379 |
| 6,485,538 B1 * | 11/2002 | Toyoshima .................... 55/490 |
| 6,497,739 B2 * | 12/2002 | McGill ......................... 55/385.2 |
| 6,554,880 B1 * | 4/2003 | Northcutt ...................... 55/385.2 |
| 6,716,267 B2 * | 4/2004 | Lawlor, Sr. ................... 55/506 |
| 6,858,055 B2 * | 2/2005 | McGill ......................... 55/385.2 |
| 7,077,835 B2 | 7/2006 | Robinson et al. |
| 7,097,692 B2 | 8/2006 | Southland et al. |
| 7,108,251 B2 | 9/2006 | Mueller |
| 7,117,910 B2 | 10/2006 | Akahori |
| 7,128,771 B2 | 10/2006 | Harden |
| 7,261,757 B2 * | 8/2007 | Duffy ........................... 55/502 |
| 7,323,028 B2 | 1/2008 | Simmons ...................... 55/495 |
| 7,332,012 B2 * | 2/2008 | O'Connor et al. ............. 55/493 |
| 7,410,520 B2 * | 8/2008 | Nowak et al. ................. 55/482 |
| 7,413,587 B2 * | 8/2008 | Beier ............................ 55/483 |
| 7,422,613 B2 * | 9/2008 | Bockle et al. ................. 55/318 |
| 7,452,396 B2 * | 11/2008 | Terlson et al. ................. 55/496 |
| 7,537,630 B2 * | 5/2009 | Schuld et al. .................. 55/496 |
| 7,588,618 B2 * | 9/2009 | Osborne et al. ............... 55/481 |
| 7,588,629 B2 * | 9/2009 | Osborne et al. ............... 96/129 |
| 7,662,216 B1 * | 2/2010 | Terres et al. ................... 95/273 |
| 7,670,401 B2 * | 3/2010 | Whittemore ................... 55/480 |
| 7,686,869 B2 * | 3/2010 | Wiser et al. ..................... 96/66 |
| 7,776,122 B2 * | 8/2010 | Feldmann ..................... 55/481 |
| 7,901,476 B2 * | 3/2011 | Kao .............................. 55/379 |
| 7,901,479 B2 * | 3/2011 | Osborne et al. ............... 55/481 |
| 7,972,401 B2 * | 7/2011 | Stock et al. .................... 55/483 |
| 7,976,604 B2 * | 7/2011 | Desjardins .................... 55/503 |
| 2002/0134061 A1 * | 9/2002 | McGill ......................... 55/385.2 |
| 2002/0139098 A1 * | 10/2002 | Beier ............................ 55/495 |
| 2003/0075923 A1 | 4/2003 | Lepoutre |
| 2004/0025996 A1 | 2/2004 | Akahori |
| 2005/0044828 A1 | 3/2005 | Southland et al. |
| 2005/0173815 A1 | 8/2005 | Mueller |
| 2005/0204713 A1 * | 9/2005 | Wu et al. ....................... 55/496 |
| 2005/0279064 A1 | 12/2005 | Simmons ...................... 55/495 |
| 2005/0284113 A1 | 12/2005 | Jang et al. |
| 2006/0121768 A1 | 6/2006 | Dworatzek et al. |
| 2006/0168925 A1 * | 8/2006 | Whittemore ................... 55/490 |
| 2007/0044441 A1 | 3/2007 | Troxell et al. |
| 2007/0084168 A1 | 4/2007 | Ashwood et al. .............. 55/486 |
| 2007/0169448 A1 * | 7/2007 | Osborne et al. ............... 55/484 |
| 2007/0199289 A1 | 8/2007 | Bland, Jr. et al. |
| 2007/0199449 A1 * | 8/2007 | Wiser et al. ..................... 96/69 |
| 2007/0204576 A1 * | 9/2007 | Terlson et al. ................. 55/496 |
| 2007/0220851 A1 * | 9/2007 | Parker et al. ................... 55/484 |
| 2007/0220854 A1 * | 9/2007 | Feldmann ..................... 55/490 |
| 2008/0184996 A1 | 8/2008 | Colorado |
| 2009/0113862 A1 * | 5/2009 | Connor et al. ................. 55/484 |
| 2009/0320426 A1 * | 12/2009 | Braunecker et al. ............ 55/511 |
| 2010/0139225 A1 | 6/2010 | Mammarella et al. .......... 55/493 |
| 2010/0192528 A1 * | 8/2010 | Mann et al. .................... 55/483 |
| 2010/0229514 A1 * | 9/2010 | Ayshford et al. .............. 55/482 |
| 2010/0251678 A1 * | 10/2010 | Mann et al. .................... 55/483 |
| 2010/0251681 A1 * | 10/2010 | Gebert .......................... 55/495 |

FOREIGN PATENT DOCUMENTS

| | | |
|---|---|---|
| CA | 2016596AA | 11/1990 |
| CA | 1322535 A1 | 9/1993 |
| CA | 2147206AA | 10/1995 |
| CA | 2204538 C | 3/2001 |
| CA | 2496056AA | 10/2005 |
| CA | 2551701AA | 12/2006 |
| CA | 2512414AA | 1/2007 |
| CA | 2565992AA | 4/2007 |
| CA | 2227816 C | 8/2007 |
| CA | 2602631AA | 3/2008 |
| CN | 1169382 A | 1/1998 |
| CN | 1752553 A | 3/2006 |
| CN | 1932278 | 3/2007 |
| CN | 1963166 A | 5/2007 |
| DE | 4211303 A1 | 10/1993 |
| DE | 4412474 A1 | 10/1995 |
| DE | 4438007 A1 | 5/1996 |
| DE | 4412474 C2 | 8/1997 |
| DE | 10002343 A1 | 7/2000 |
| DE | 20216538 U1 | 2/2003 |
| DE | 20218457 U1 | 3/2003 |
| DE | 10332984 A1 | 2/2005 |
| DE | 10339082 A1 | 3/2005 |
| DE | 102005031501 A1 | 1/2007 |
| DE | 102006056225 A1 | 6/2008 |
| EP | 0065064 A2 | 11/1982 |
| EP | 0065064 A3 | 1/1984 |
| EP | 0065064 B1 | 11/1986 |
| EP | 0225448 A1 | 6/1987 |
| EP | 0232640 A1 | 8/1987 |
| EP | 0318636 A1 | 6/1989 |
| EP | 0398091 A1 | 11/1990 |
| EP | 0453657 A2 | 10/1991 |
| EP | 0453657 A3 | 10/1992 |
| EP | 0318636 B1 | 11/1992 |
| EP | 0555761 A1 | 8/1993 |
| EP | 0560298 A2 | 9/1993 |
| EP | 0620133 A1 | 10/1994 |
| EP | 0634203 A2 | 1/1995 |
| EP | 0634203 A3 | 4/1995 |
| EP | 0560298 A3 | 8/1995 |
| EP | 0398091 B1 | 1/1996 |
| EP | 0699465 A2 | 3/1996 |
| EP | 0555761 B1 | 4/1996 |
| EP | 0699465 A3 | 5/1996 |
| EP | 0735266 | 10/1996 |
| EP | 0735266 A1 | 10/1996 |
| EP | 0765517 | 4/1997 |
| EP | 0620133 B1 | 9/1997 |
| EP | 0765517 A4 | 1/1998 |
| EP | 0818337 A2 | 1/1998 |
| EP | 0634203 B1 | 8/1998 |
| EP | 0856093 A1 | 8/1998 |
| EP | 0560298 B1 | 6/1999 |
| EP | 0951335 A1 | 10/1999 |
| EP | 0818337 A3 | 12/1999 |
| EP | 0699465 B1 | 2/2001 |
| EP | 0765517 B1 | 5/2001 |
| EP | 1184268 A2 | 3/2002 |
| EP | 0818337 B1 | 8/2002 |
| EP | 0951335 B1 | 5/2003 |
| EP | 1184268 A3 | 10/2003 |
| EP | 1184268 B1 | 10/2007 |
| EP | 1884277 A1 | 2/2008 |
| FR | 2823989 A1 | 10/2002 |
| FR | 2823989 B1 | 7/2003 |
| GB | 0682845 | 11/1952 |
| GB | 0724179 | 2/1955 |
| GB | 0759992 | 10/1956 |
| GB | 1045309 A | 10/1966 |
| GB | 1072791 | 6/1967 |
| GB | 1082503 | 9/1967 |
| GB | 1104643 A | 2/1968 |
| GB | 1190959 | 5/1970 |
| GB | 1367734 A | 9/1974 |
| GB | 2302292 A | 1/1997 |
| GB | 2302292 B2 | 2/1998 |
| GB | 2340596 A | 2/2000 |
| GB | 2340596 B | 7/2002 |
| GB | 2415398 A | 12/2005 |
| GB | 2415398 A1 | 12/2005 |
| JP | 57007219 A2 | 1/1982 |
| JP | 57031738 A2 | 2/1982 |
| JP | 60060433 A2 | 4/1985 |
| JP | 60060435 A2 | 4/1985 |
| JP | 61240039 A2 | 10/1986 |
| JP | 63009742 A2 | 1/1988 |
| JP | 02140525 | 5/1990 |
| JP | 02252185 A2 | 10/1990 |
| JP | 03207935 | 9/1991 |
| JP | 05141645 A2 | 6/1993 |
| JP | 05141689 | 6/1993 |
| JP | 07098149 A2 | 4/1995 |
| JP | 08224417 A2 | 9/1996 |
| JP | 08226574 A2 | 9/1996 |
| JP | 09075640 | 3/1997 |
| JP | 09155158 A2 | 6/1997 |
| JP | 09173892 A2 | 7/1997 |
| JP | 09184656 A2 | 7/1997 |
| JP | 09287812 A2 | 11/1997 |
| JP | 09330557 A2 | 12/1997 |
| JP | 11059861 | 3/1999 |
| JP | 11169614 A2 | 6/1999 |
| JP | 2001227814 | 8/2001 |
| JP | 2002210426 | 7/2002 |
| JP | 2003190049 A2 | 7/2003 |
| JP | 2003334410 A2 | 11/2003 |
| JP | 2004167323 A2 | 6/2004 |
| JP | 2005103356 A2 | 4/2005 |
| JP | 2006003002 A2 | 1/2006 |
| JP | 2006132895 A2 | 5/2006 |
| JP | 2006305508 A2 | 11/2006 |
| JP | 2007046588 A2 | 2/2007 |
| JP | 2007132607 A2 | 5/2007 |
| JP | 2007296481 A2 | 11/2007 |
| KR | 20010048149 A | 6/2001 |
| KR | 20020025646 A | 4/2002 |
| KR | 20020055182 | 7/2002 |
| KR | 20030034003 A | 5/2003 |
| KR | 20030079893 A | 10/2003 |
| KR | 20030093063 A | 12/2003 |
| KR | 20040076781 A | 9/2004 |
| MX | 9601164 A | 2/1997 |
| MX | PA02011936 A | 6/2004 |
| MX | 5007008 A | 2/2006 |
| RO | 0117217 B1 | 11/2001 |
| RO | 0118492 B1 | 5/2003 |
| RU | 2130521 C1 | 5/1999 |
| RU | 2209736 C2 | 8/2003 |
| RU | 2236122 C1 | 9/2004 |
| SK | 0280735 B6 | 7/2000 |
| TW | 0247078 B | 1/2006 |
| WO | WO8907225 A1 | 8/1989 |
| WO | WO9632714 | 10/1996 |
| WO | WO9807949 A1 | 2/1998 |
| WO | WO0181740 A1 | 11/2001 |
| WO | WO02066272 A2 | 8/2002 |
| WO | WO2005076922 A2 | 8/2005 |
| WO | WO2005076922 A3 | 8/2005 |
| WO | WO2006080689 A1 | 8/2006 |
| WO | WO2007042194 A1 | 4/2007 |
| WO | WO200803138 A3 | 3/2008 |
| WO | WO2008030138 A2 | 3/2008 |
| WO | WO2008068327 A1 | 6/2008 |

OTHER PUBLICATIONS

U.S. Appl. No. 12/404,068, filed Mar. 13, 2009, Ayshford et al.

* cited by examiner

FIG. 7

FILTER RETENTION SYSTEMS AND DEVICES

BACKGROUND OF THE INVENTION

The subject matter disclosed herein relates to systems and devices for retaining a filter within a filter holding frame.

Power generation equipment such as gas turbine engines use a large supply of intake air to support the combustion process. To maintain suitable performance of the turbine, the intake air is filtered to remove unwanted dust, moisture, and other contaminants. The filters that filter the intake air are typically arranged in an array on a large filter frame located within a filter house. The filters are removable to enable cleaning and replacement of the filters. Often, the filters are held in place by the intake air pressure, which may, in some cases, sufficiently press the filter against the filter receptacle to prevent air from flowing around the filter. In some applications however, such as wherein the filter is tilted, the air pressure alone may not be enough to hold the filter in place. However, retainers often have loose parts and protrusive profiles. In context of turbine engines, it is generally undesirable to have loose parts in the flow path. Additionally, the protrusive profiles may obstruct walkways or other areas.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a filter assembly and a turbine engine configured to receive filtered air from the filter assembly. The filter assembly includes a plurality of filters and a filter holding frame. The filter holding frame includes a plurality of filter cells and a plurality of retainers, wherein each retainer has a retaining pad coupled to a shaft, and the retaining pad and shaft of each retainer are movable lengthwise along an axis of the shaft to secure and release a filter in a filter cell of the plurality of filter cells.

In a second embodiment, a system includes a filter holding frame configured to support a plurality of filters for a turbine engine. The filter holding frame has a first filter cell and a first retainer. The first retainer has a first retaining pad coupled to a first shaft, wherein the first retaining pad and the first shaft are movable to secure and release a first filter in the first filter cell.

In a third embodiment, a system includes a turbine filter retainer that includes a shaft, a retention pad and a bracket. The retention pad is coupled to the shaft and configured to secure a first filter in a first filter cell of a filter holding frame. The shaft and the retention pad are movable together lengthwise along an axis of the shaft. The bracket is coupled to the shaft and configured to secure a second filter in a second filter cell of the filter holding frame.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present invention include a filter retention device for use in a filtering system that provides intake air to machinery in a power generation facility. In particular, some embodiments of the present invention provide a filter retention device with a shaft that is movably coupled to a filter frame, such that the shaft may move linearly inward or outward along an axis of the shaft to secure or release a filter (e.g., perpendicular to the plane of the filter and one filter frame). When engaged, the shaft may be substantially retracted within the filter frame. Furthermore, the shaft may be restrained at both ends so that the shaft is not easily removable from the frame. In some embodiments, a second filter retaining device may be configured to secure or release a second filter. In various embodiments, the shaft may be threaded or spring loaded. Additionally, the shaft may be coupled to a hinge that allows the shaft to be rotated into or out of the retaining position (e.g., along a rotational axis in the plane of the filter and the filter frame). The retainers described herein use relative little material, are inexpensive, simple to fabricate and operate, and include no loose parts.

Figure 1:
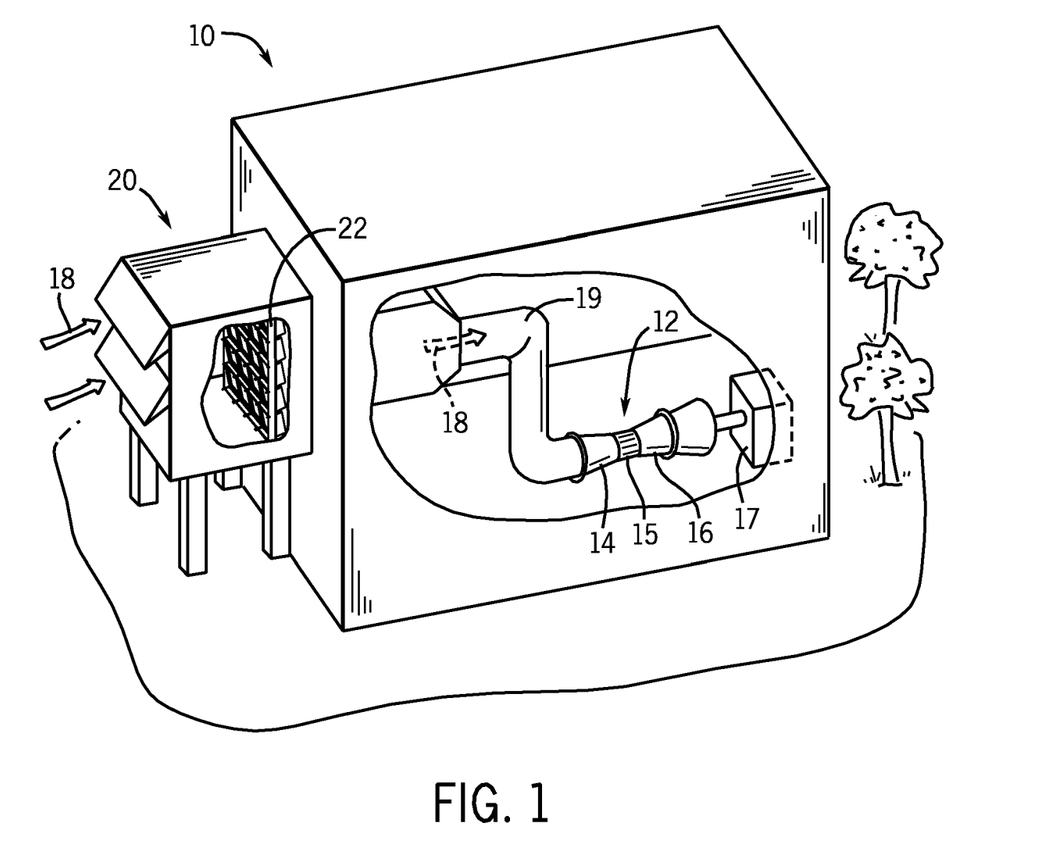
FIG. 1 is a perspective view of an embodiment of a power generation facility with a filter frame that uses the novel filter retaining systems and methods disclosed herein.

FIG. 1 is a perspective view of an embodiment of a power generation facility 10 with a filter frame 22 that uses the novel filter clamps disclosed herein. The power generation facility 10 includes a gas turbine engine 12 coupled to a generator to generate electrical power. In general, the turbine engine 12 includes an air compressor 14, one or more combustors 15 that receive and combust an air-fuel mixture of compressed air and fuel, and one or more turbines 16 driven by hot gases of combustion of the air-fuel mixture. Thus, the hot gases of combustion drive the turbines 16, which in turn drive the compressor 14 and one or more other loads. For example, in the illustrated embodiment, the turbine engine 12 may be coupled to a variety of loads, such as an electrical generator 17. The turbine engine 12 draws intake air 18 into the air compressor 14 from the outdoors through air ducts 19. As the intake air 18 enters the facility 10, it first passes through a filter house 20. Inside the filter house 20, an array of filters, held by one or more filter frames 22, filter the intake air 18 to remove contaminants such as dust, dirt, moisture, salt, carbon and any other contaminants that may tend to reduce the performance of the turbine engine 12. As will be described further below, the filter frames 22 may be tilted to provide efficient runoff of water that may collect on the filters. The filter house 20 may be several stories high, and may house up to several hundred filters, which may be held by several filter frames 22.

Figure 2:
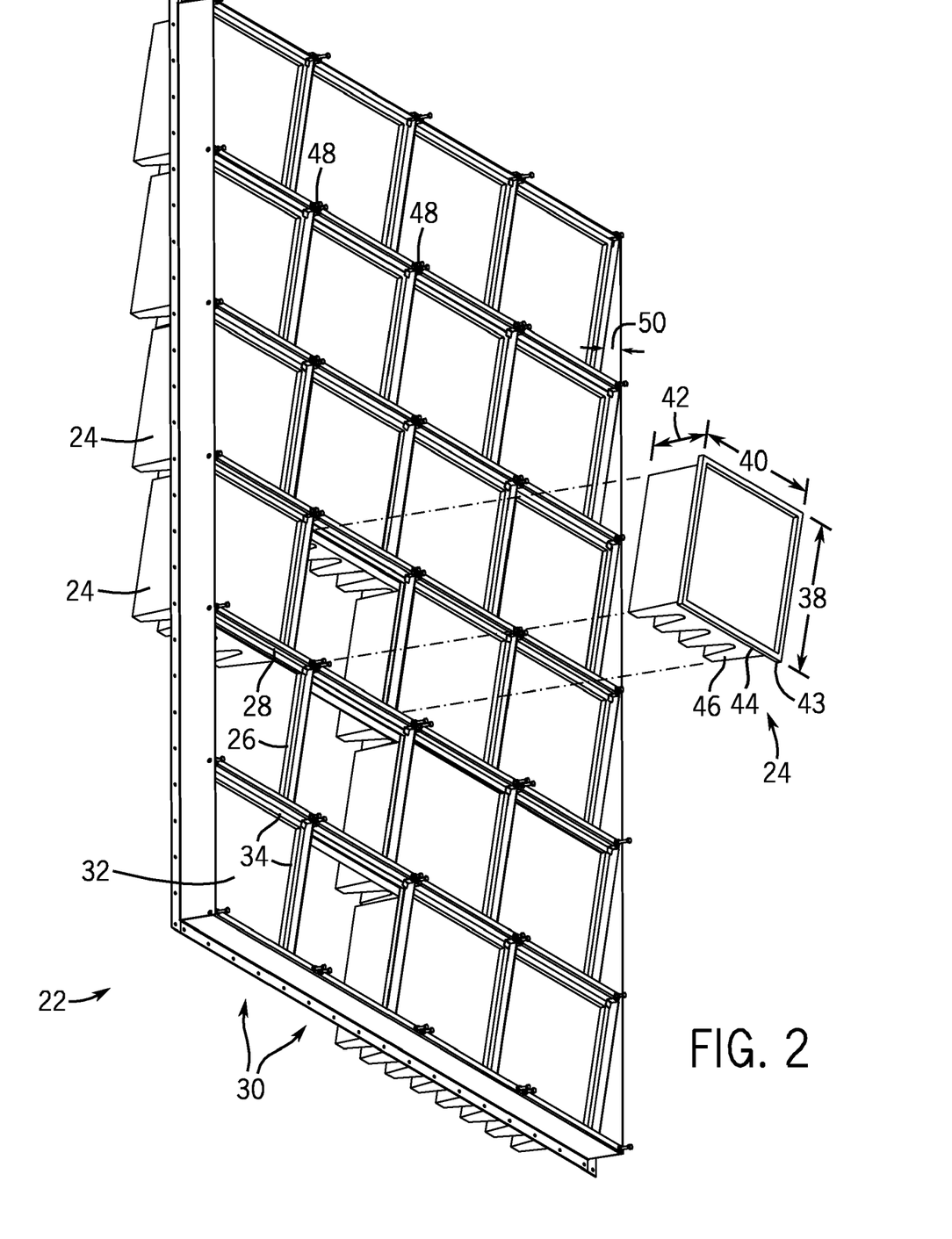
FIG. 2 is a perspective view of an embodiment of the filter frame of FIG. 1.

FIG. 2 is a perspective view of an embodiment of the filter frame 22 of FIG. 1. As shown in FIG. 2, the filter frame 22 includes a set of inclined supports 26 and tilted horizontal supports 28. The supports 26 and 28 may be described as panels, bars, beams, or framework of the filter frame 22. Together, the supports 26 and 28 define a skeletal structure of the filter frame 22. The support panels 26 and 28 define filter cells 30, each of which holds a single air filter 24. Each filter cell 30 includes an aperture 32 through which the filter 24 may pass and a sealing face 34 that blocks air from flowing around the filter 24. The filter 24 may include a filter body 46 that passes through the aperture 32 and a mounting frame 43 having a sealing gasket 44 that fits inside the filter cell 30 and is compressed against the sealing face 34. In the embodiment of FIG. 2, the sealing gasket 44 is disposed along a rear face of the mounting frame 43, such that it faces the filter frame 22. Thus, the sealing gasket 44 becomes compressed between the filter frame 22 and the mounting frame 43, which is biased by the one or more filter retainers 48 as discussed in detail below.

The filter height 38 and width 40 may be approximate 300 to 900 mm, the filter depth 42 may be approximately 200 to 700 millimeters, and each filter may weight approximately 10 to 20 kilograms. In certain embodiments, the filter height 38 and width 40 may be approximate 600 mm, the filter depth 42 may be approximately 400 to 500 millimeters, and each filter may weight approximately 15 kilograms. The filters 24 may be hydrophobic (i.e., water repellant) and may be any suitable filter style, such as bag filters or mini-pleat filters. Additionally, in embodiments having the frame 22 installed in a vertical configuration, the filter cells 30 and the filters 24 disposed therein may be tilted relative to the filter frame 22 to provide suitable drainage of water that may collect on the outside of the filters 24, as will be explained further in relation to FIG. 4. In some embodiments, the filters 24 may be tilted by an angle 50 of less than approximately 5, 10, 15, or 20 degrees relative to vertical.

The filter retainers 48 are configured to bias the mounting frames 43 of the filter 24 against the sealing face 34 of the filter frame 22. In this manner, the filter retainers compress the filter gaskets 44 between the mounting frames 43 and the filter frames 22. For example, the compressive force imparted by the filter retainers 48 may cause the filter gaskets 44 to compress or reduce in thickness by at least approximately 10, 20, 30, 40, 50, 60, or 70 percent. In certain embodiments, the total compressive force per filter 24, and thus per gasket 44, may be approximately 10 to 100, 40 to 80, or 60 kilograms. Each filter 24 may be held in place by two or more filter retainers 48. In certain embodiments, each filter 24 is held by four retainers 48. In the embodiment shown, the retainers 48 are coupled to the horizontal support panel 28, however, it will be understood that in other embodiments some or all of the retainers 48 may also be coupled to the inclined support panels 26. Additionally, some or all of the filter retainers 48 may compress at least two of the filters 24.

Figure 3:
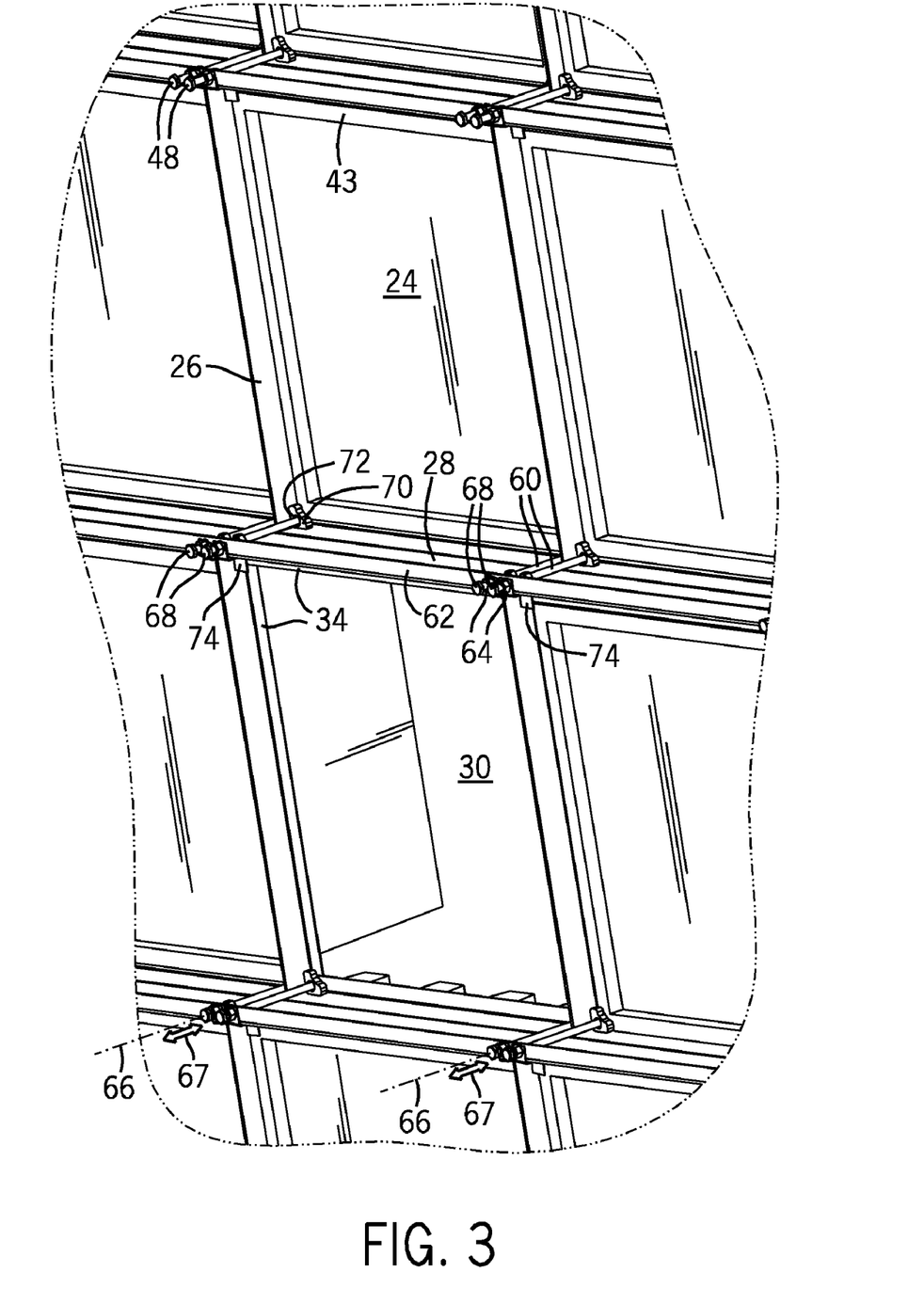
FIG. 3 is a close-up perspective view of an embodiment of a filter cell of the filter frame of FIG. 2, illustrating several filter retainers.

FIG. 3 is a close-up perspective view of an embodiment of a filter cell 30 of the frame 22, illustrating several retainers 48 coupled thereto. Each of the filter retainers 48 may include a shaft 60 coupled to the filter frame 22 via the horizontal support panel 28. Moreover, rather than providing a shaft that is immovably fixed to the frame 22 and coupling a retaining device to the shaft, the shaft 60 of the present disclosure is movable relative to the frame to engage the mounting frame 43 having the filter gasket 44. This enables the shaft 60 to be retracted into the frame 22 during engagement of the retainer 48. Accordingly, the horizontal panel 28 may include an L-shaped lip 62 opposite from the sealing face and bending upward at a ninety degree angle relative to the horizontal panel 28. The L-shaped lip 62 may include a through hole 64 that captivates the shaft 60 and enables the shaft 60 to move lengthwise inward or outward along axis 66 of the shaft as indicated by the arrows 67. In the illustrated embodiment, the axis 66 is perpendicular to a plane of the filter 24. During filter installation, the shaft 60 may be moved axially outward, i.e. away from the sealing face 34, to provide space for inserting the filter 24 into the filter cell 30. With the shaft 60 in the outward position, the retainer 48 is disengaged and the filter 24 is, therefore, released. After inserting the filter 24 into the filter cell 30, the shaft 60 may be moved axially inward, i.e. toward the sealing face 34, thereby sandwiching and compressing the mounting frame 43 having the gasket 44 between the shaft 60 and the sealing face 34 with sufficient force to block air from flowing between the gasket 44 and the sealing face 34. When the shaft 60 is compressing the mounting frame 43 having the gasket 44 against the sealing face 34, the retainer 48 is engaged and the filter 24 is secured.

At the outward end of the shaft 60, the shaft 60 may include a head 68 that is larger than the through hole 64 and therefore blocks the shaft 60 from passing through the through hole 64 at the outward end. In some embodiments, the head 68 may be a bolt head and may also enable the shaft 60 to be rotated. Furthermore, at the inward end of the shaft 60, there may be a retention pad 70 rotatably coupled to the shaft 60 by a non-threaded rotatable joint 72 and configured to spread the compressive force applied by the shaft 60 over a greater surface area of the mounting frame 43 having the gasket 44. In some embodiments, the retention pad 70 may be V-shaped to match the V-shaped contour of the corner of the filter cell 30. Additionally, the retention pad 70 may be fixedly secured to the shaft 60 to block the retention pad 70 from being easily removed from the shaft 60, thereby blocking the shaft 60 from passing through the through-hole 64 at the inward end of the shaft 60. It will therefore be appreciated that the shaft 60 is fixedly secured to the frame 22 by the head 68 at the outward end and the retention pad 70 at the inward end.

In some embodiments, the retainers 48 may also include a bracket 74 captively coupled to the shaft 60 and configured to retain a second filter 24 in an adjacent filter cell 30. In certain embodiments, the bracket 74 may be Z-shaped, with a through hole at one end for coupling to the shaft 60 and a retention surface at the other end for compressing the mounting frame 43 having the filter gasket 44. Aspects of the retainer 48 may be better understood with reference to FIGS. 4-6.

Figure 4:
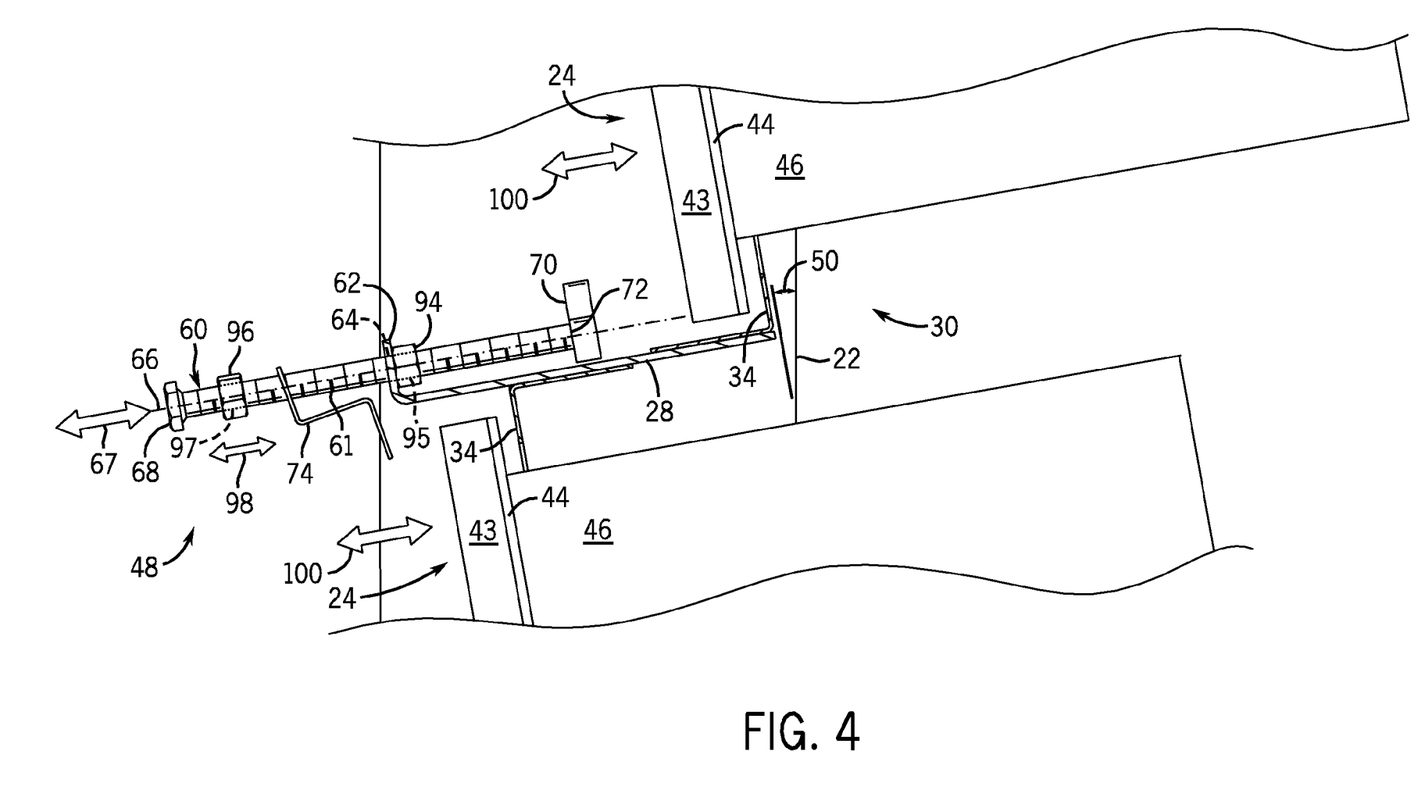
FIGS. 4-6 are cut-away side views of an embodiment of the filter retainers shown in FIG. 3 at various stages of engagement.

FIG. 4 is a cut-away side view of an embodiment of the filter retainer 48 shown in FIG. 3. As illustrated, the tilted horizontal support panel 28 includes the lip 62 facing upward at a peripheral edge, such that it may facilitate water drainage horizontally away from the filters 24. In other words, the lip 62 functions to block water drainage from falling on filters 24 mounted further below in the filter frame 22. Instead, the lip 62 channels the water drainage to a suitable location to avoid wetting adjacent filters 24. In this way, the water collecting on the higher filters 24 does not substantially degrade the performance of the lower filters 24.

As mentioned above, the retainer 48 may include a shaft 60 coupled to the horizontal support panel 28 of the frame 22 via the through hole 64 in the lip 62. As is more clearly shown in FIG. 4, the shaft 60 may be threaded and configured to mate with a female threaded nut 94 welded or otherwise fixed to the inward side of the lip 62. In this way, the shaft 60 may be moved lengthwise inward or outward (arrow 67) along the axis 66 of the shaft 60 by rotating the shaft 60 via mating threads 61 and 95. The range of movement of the shaft 60 may be limited, in part, by the retention pad 70 at one end of the shaft 60 and the head 68 at the other end of the shaft 68. In this way, the retainer 48 is held captive to the filter frame 22, and is, therefore, not easily removable, thus reducing the possibility of introducing a loose part into the air duct 19 (FIG. 1.) Additionally, the bracket 74 may be independently secured or released by a female threaded fastener 96, such as a wing nut for example, that is movable along the length of the shaft 60 via mating threads 61 and 97, as indicated by the arrow 98. As shown in FIG. 4, both the shaft 60 and the bracket 74 are moved outward to allow the upper filter 24 and the lower filter 24 to be removed and/or inserted as indicated by the arrows 100.

Figure 5:
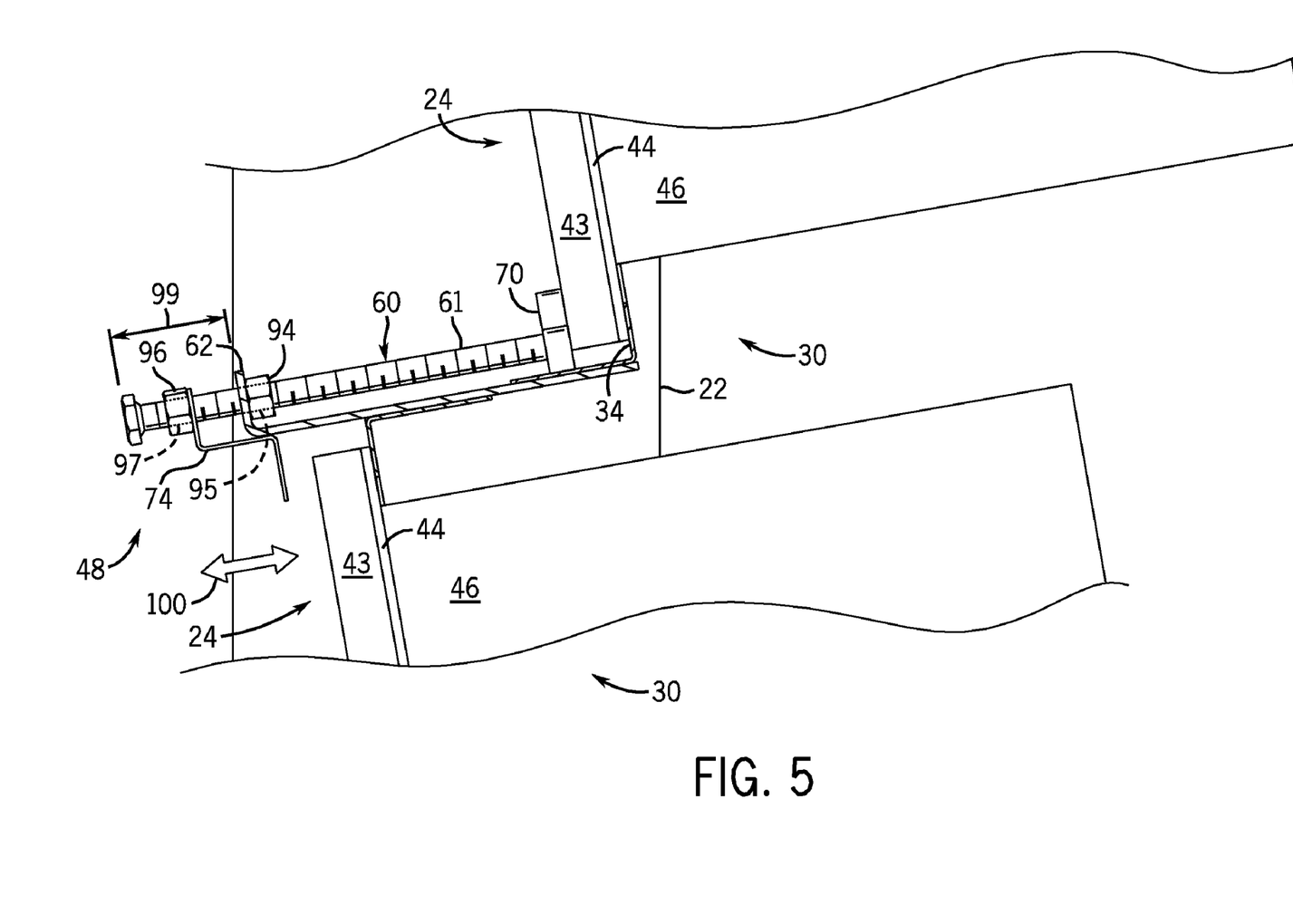

Turning now to FIG. 5, the retainer 48 of FIG. 4 is shown in a partially engaged condition. As shown in FIG. 5, the shaft 60 has been rotated inward via mating threads 61 and 95 so that the retention pad 70 is pressing the mounting frame 43 with the filter gasket 44 of the top filter 24 against the sealing face 34 of the top filter cell 30. In some embodiments, the degree of compressive force exerted by the retention pad 70 may be determined by exerting a specified torque to the shaft 60 via a torque wrench. Additionally, although the shaft 60 is rotated inward, the fastener 96 is still rotated outward, enabling the bracket 74 to be moved independently outward along the shaft 60 and out of contact with the mounting frame 43 having the filter gasket 44 of the bottom filter 24, as shown in FIG. 5. With this arrangement, the top filter 24 is secured within the top filter cell 30, but the bottom filter 24 is released and able to be removed and/or installed as indicated by the arrow 100. As shown in FIG. 5, the shaft 60 has been retracted into the filter frame 22, thereby minimizing the protrusion of the shaft 60 from the filter frame 22. In some embodiments, the shaft 60 may protrude from the filter frame by a distance 99 of less than approximately 1, 2, or 3 inches, for example. By minimizing the protrusion of the shaft 60, the area around the filter frame 22 may be less obstructed, enabling improved access to the filter frame 22 during insertion or removal of the filters 24 or other service and maintenance within the filter house 20 (see FIG. 1).

Figure 6:
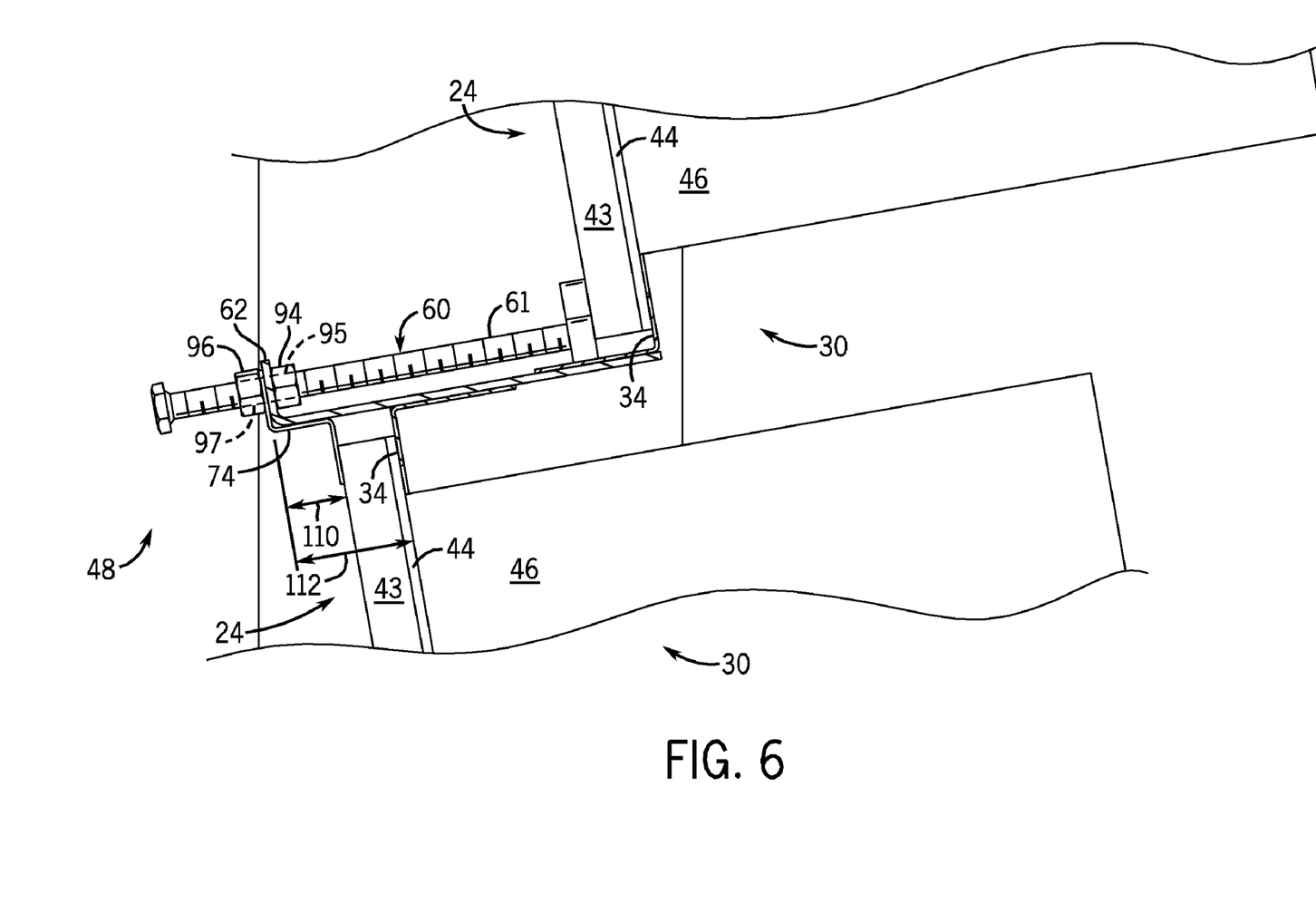

Turning now to FIG. 6, the retainer 48 of FIG. 4 is shown in a fully engaged condition. As shown in FIG. 6, the shaft 60 is still rotated inward via mating threads 61 and 95 so that the retention pad 70 is pressing the mounting frame 43 having the filter gasket 44 of the top filter 24 against the sealing face 34 of the top filter cell 30. Additionally, the fastener 96 has also been rotated independently inward via mating threads 61 and 97 to bring the bracket 74 into contact with the mounting frame 43 having the filter gasket 44 of the bottom filter 24, thereby compressing the filter gasket 44 of the bottom filter 24 between the mounting frame 43 and the sealing face 34 of the bottom filter cell 30. With this arrangement, both the bottom filter 24 and the top filter 24 are secured within their respective filter cells 30. Furthermore, tightening the fastener 96 against the lip 62 may also lock the shaft 60 in position. In this way, the fastener 96 may also serve to prevent the shaft 60 from inadvertently loosening over time due to vibration. The degree of compression applied by the bracket 74 to the mounting frame 43 having the filter gasket 44 may be determined by the resiliency of the bracket 74 as well as the depth 110 of the bracket 74 relative to the depth 112 of the filter cell 30 from the outward surface of the lip 62 to the sealing face 34.

As shown in FIGS. 5 and 6, one of the advantages provided by the fastener 48 is that the shaft 60 does not protrude extensively from the outward surfaces of the filter frame 22 when the retainer 48 is in the engaged, i.e. retaining, position, thereby reducing the obstruction of walking areas around the filter frame 22. It will also be appreciated that in embodiments without a bracket 74, the shaft 60 may be further shortened, thereby further reducing the protrusion of the shaft 48 from the filter frame 22.

Figure 7:
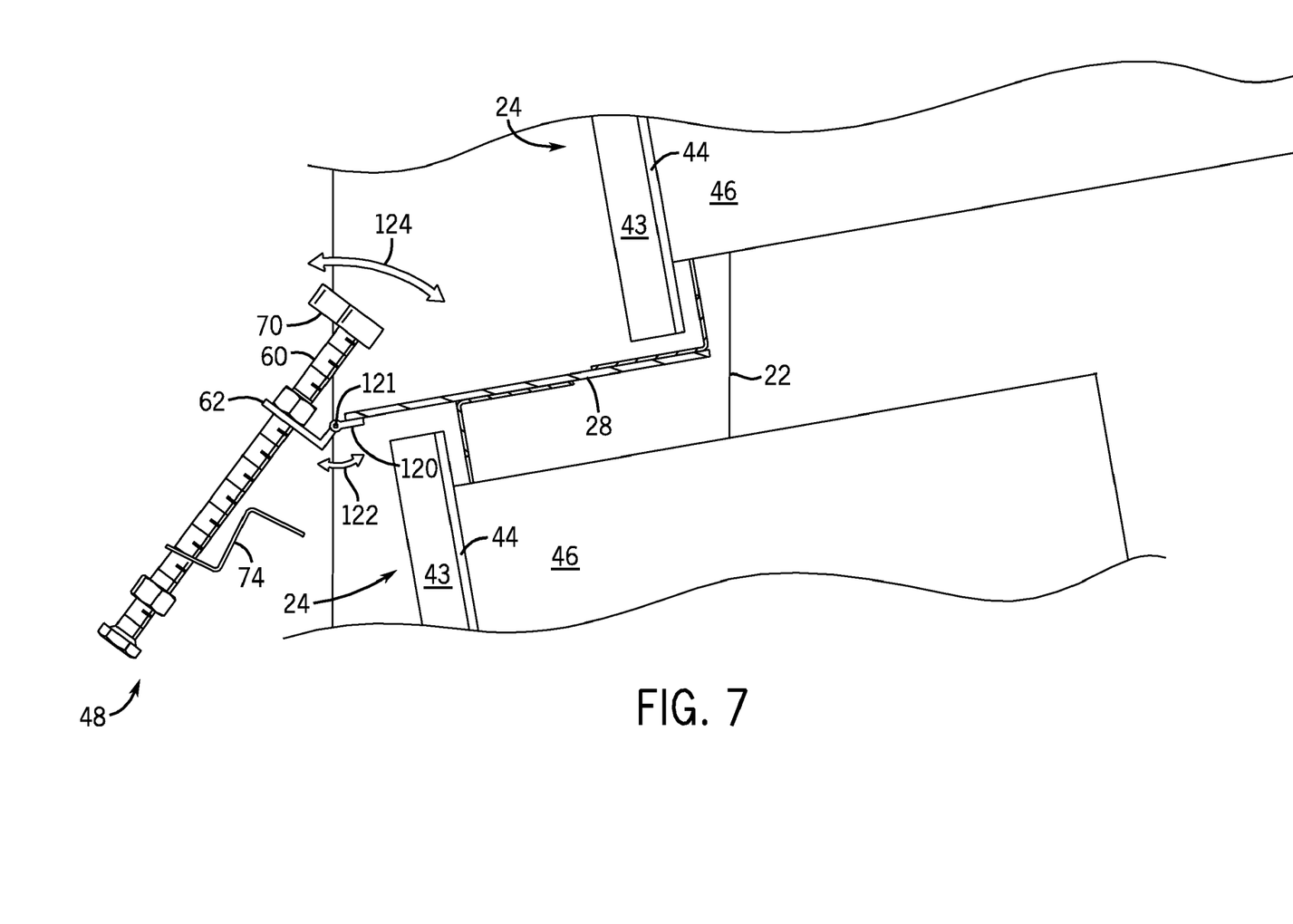
FIG. 7 is a cut-away side view of an embodiment of a filter retainer with a hinge.
Figure 8:
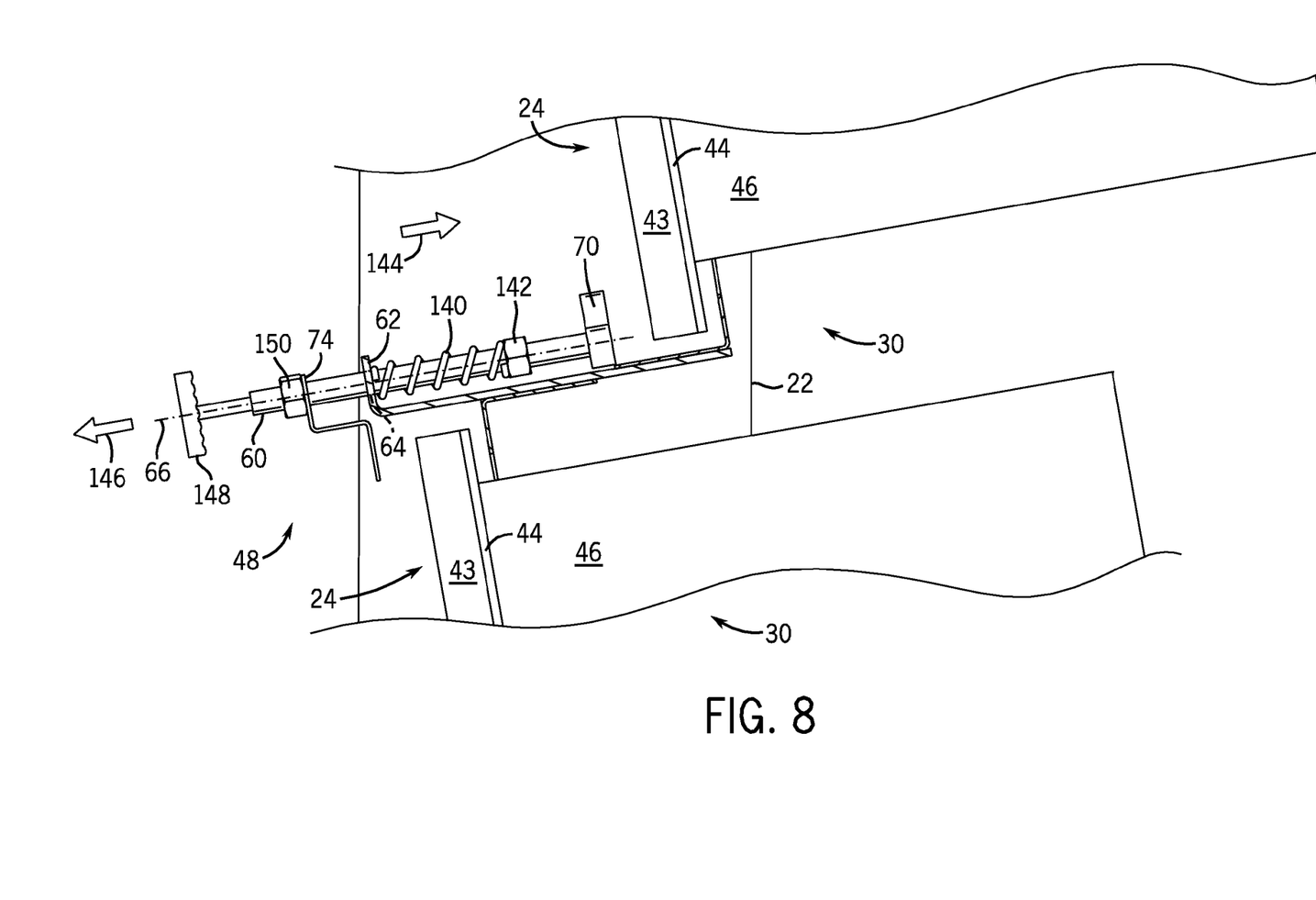
FIG. 8 is a cut-away side view of an embodiment of a spring-actuated filter retainer.

Various other embodiments of the retainer 48 are shown in FIGS. 7 and 8, both of which are described below. FIG. 7 is a cut-away side view of an embodiment of a filter retainer 48 with a hinge 120. As shown in FIG. 7, the hinge 120 is coupled to the horizontal support panel 28 of the filter frame 22, and the lip 62 that holds the shaft 60 is coupled to the hinge 120. When the retainer 48 is disengaged, as shown, the hinge 120 is free to rotate about a horizontal rotation axis 121 that is parallel to the filter frame 22, as indicated by the arrow 122. Rotation of the hinge 120 also rotates the shaft 60 and the retention pad 70, as indicated by arrow 124. Rotating the hinge 120 downward, i.e. counterclockwise, rotates the shaft 60 and the retention pad 70 outward, away from the top filter 24, providing more space between the retention pad 70 and the mounting frame 43 having the filter gasket 44, thereby enabling the top filter 24 to be more easily removed or inserted. Moreover, to disengage the retainer 48, the shaft 60 may be moved linearly outward, e.g. unscrewed, just enough to allow the hinge 120 to rotate freely. In this way, the time and effort used to disengaging the retainer 48 may be reduced. To engage the filter retainer 48, the shaft 60 may be rotated upward via hinge 120 (i.e., clockwise), and the shaft 60 moved linearly inward until the mounting frame 43 having the filter gasket 44 is sufficiently compressed. At this point, the hinge 120 will no longer be free to rotate. The bracket 74 may then be engaged as described above, which also inhibits the rotation of the hinge 120.

FIG. 8 is a cut-away side view of an embodiment of a spring actuated filter retainer 48. As shown in FIG. 8, the shaft 60 and the through-hole 64 in the lip 62 that holds the shaft 60 may both be unthreaded, and the shaft 60 may move lengthwise along the axis 66 of the shaft 60 within the through-hole 64. The retainer also includes a spring 140 captivated between the inward side of the lip 62 and the retention pad 70. In some embodiments, the spring 140 may also be captivated between the inward side of the lip 62 and a stop 142 coupled to the shaft 60 between the inward side of the lip 62 and the retention pad 70 as shown in FIG. 8. In certain embodiments, the retention pad 70 and the stop 142 may be integral (i.e., one-piece) with or coupled to the shaft 60. For example, the retention pad 70 and the stop 142 may be coupled to the shaft 60 via a weld, braze, screws, bolts, rivets, threads, stakes, or any suitable fastening mechanism. The spring 140, therefore, biases the shaft 60 inward toward the mounting frame 43 having the filter gasket 44, as indicated by the arrow 144, and exerts a compressive force to the mounting frame 43 having the gasket 44 when the retainer 48 is engaged. In this embodiment, the compressive force exerted on the mounting frame 43 having the filter gasket 44 may be predetermined based, in part, on the resiliency of the spring 60. To disengage the retainer 48, as shown in FIG. 8, the operator pulls the shaft 60 outward as indicated by the arrow 146, and the filter 24 may then be removed and/or installed. To aid the operator in grasping the shaft 60, the shaft may also include a handle 148. To re-engage the retainer 48, the operator may release the shaft 60 allowing the shaft 60 to return to the engaged position. In other words, the retainer 48 automatically biases the filter 24 upon release of the handle 148. In this way, the retainer 48 may be quickly and easily operated, enabling the filter removal and installation processes to be completed in less time.

Furthermore, the bracket 74 may also be configured to be biased by the spring 140 so that both the top filter 24 and the bottom filter 24 are simultaneously engaged or disengaged. For example, the bracket 74 may be captivated by a second stop 150 that may be welded or otherwise permanently fixed to the shaft 60 at a specified position along the shaft 60. In this way, when the shaft 60 is released to engage the retainer 48, the second stop 150 will press against the bracket 74, and the bracket 74 will exert a compressive force on the mounting frame 43 having the filter gasket 44 of the bottom filter 24. In alternate embodiments, the same effect may be achieved by welding or otherwise permanently fixing the bracket 74 to the shaft 60 at a specified position along the shaft 60 and, optionally, eliminating the second stop 150.

The filter retaining systems and methods described herein provides several advantages. For example, embodiments described herein use less material, and are simple to fabricate and operate. Additionally, unlike other filter retention devices, the retaining system herein does not use any loose or easily detachable parts, thereby reducing the possibility that a part could become free and damage the turbine. Furthermore, the retaining system described herein reduces the obstruction of areas around the filter frame 22, because the shaft 60 does not protrude extensively from the outward surfaces of the filter frame 22 when the retainer 48 is in the retaining position. For example, in some embodiments, the filter retainer may protrude less than 1, 2, or 3 inches from the face of the filter frame 22. The spring-actuated embodiments described herein also provide additional advantages. For example, in the spring-actuated and/or hinged embodiments no additional tools are used to engage or disengage the retainer, and the retaining pressure applied to the filter gasket is reliable and repeatable and is less dependent on the skill of the installer. Furthermore, the faster, simpler operation of the retainer makes the overall filter removal and installation process much faster, particularly when repeated for the dozens or even hundreds of filters in a filter house.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a filter assembly, comprising:
      a plurality of filters; and
      a filter holding frame, comprising:
         a plurality of filter cells;
         a plurality of retainers, wherein each retainer comprises a retaining pad coupled to a shaft, the retaining pad and shaft of each retainer are movable lengthwise along an axis of the shaft to secure and release a filter in a filter cell of the plurality of filter cells, each retainer comprises a hinge coupled to the filter holding frame, and the shaft and coupled retaining pad of each retainer are rotatable about a rotational axis of the hinge toward and away from a retaining position; and
   a turbine engine configured to receive filtered air from the filter assembly.

2. The system of claim 1, wherein each retainer comprises a head coupled to the shaft at a first end opposite from a second end having the retaining pad, and a range of motion of the shaft of each retainer is limited by the head at the first end and the retaining pad at the second end.

3. The system of claim 1, wherein the shaft of each retainer is configured to retract toward the filter holding frame when the shaft is securing a respective filter.

4. The system of claim 1, wherein the shaft of each retainer comprises a threaded shaft having male threads coupled to female threads secured to the filter holding frame, and the shaft of each retainer is rotatable to enable lengthwise movement of the shaft and coupled retaining pad.

5. The system of claim 1, wherein each retainer comprises a spring biasing the shaft and the retaining pad toward the filter in the respective filter cell.

6. The system of claim 1, wherein each retainer comprises a bracket coupled to the shaft, the bracket of each retainer is independently movable lengthwise along the axis of the shaft, and the bracket of each retainer is configured to secure another filter in another filter cell adjacent to the filter in the filter cell.

7. A system, comprising:
   a filter holding frame configured to support a plurality of filters for a turbine engine, wherein the filter holding frame comprises:
      a first filter cell; and
      a first retainer comprising a first retaining pad coupled to a first shaft, wherein the first retaining pad and the first shaft are movable to secure and release a first filter in the first filter cell, wherein the first shaft is a threaded shaft that is rotatable to move the first shaft and the retaining pad lengthwise along an axis of the first shaft between a first position biased against the first filter in the first filter cell and a second withdrawn position retracted away from the first filter.

8. The system of claim 7, wherein the first retainer includes a bracket independently movable along the first shaft and configured to secure a second filter in a second filter cell.

9. The system of claim 7, wherein the first retainer comprises a hinge coupled to the filter holding frame, and the first retaining pad and the first shaft are rotatable about a rotational axis of the hinge to secure and release the first filter in the first filter cell.

10. The system of claim 7, wherein the first retaining pad is V-shaped and fits a V-shaped contour of the first filter cell.

11. The system of claim 7, wherein the first retainer includes a spring that biases the first retaining pad and the first shaft inward toward the first filter cell.

12. The system of claim 11, wherein the first retainer includes a bracket fixed at a position along the length of the first shaft, and the spring biases the bracket inward toward a second filter in a second filter cell.

13. The system of claim 7, wherein the first retainer is configured to secure at least a second filter in a second filter cell that is adjacent to the first filter cell and spaced outward horizontally relative to the first filter cell.

14. The system of claim 7, wherein the first retaining pad is rotatably coupled to the first shaft via a non-threaded rotatable joint.

15. The system of claim 7, comprising the turbine engine.

16. A system, comprising:
a turbine filter retainer, comprising:
a shaft;
a retention pad coupled to the shaft and configured to secure a first filter in a first filter cell of a filter holding frame, wherein the shaft and the retention pad are movable together lengthwise along an axis of the shaft; and
a bracket coupled to the shaft and configured to secure a second filter in a second filter cell of the filter holding frame.

17. The system of claim 16, wherein the shaft comprises a threaded shaft coupled to a female threaded joint secured to the filter holding frame, the retention pad is secured to a first end of the threaded shaft via a non-threaded rotatable joint, the female threaded joint is intermediate between the retention pad at the first end and a head at an opposite second end of the shaft, the bracket is coupled to the threaded shaft between the female threaded joint and the head, and the bracket is adjacent to a female threaded nut configured to secure the bracket to the second filter.

18. The system of claim 16, wherein the turbine filter retainer comprises a spring captured between the retention pad and the filter holding frame, and the spring is configured to bias the shaft and retention pad toward the first filter in the first filter cell.

19. The system of claim 16, wherein the turbine filter retainer comprises a hinge configured to be secured to the filter holding frame and allow the shaft and respective retention pad to rotate into or out of a retaining position.

20. A system, comprising:
a filter holding frame configured to support a plurality of filters for a turbine engine, wherein the filter holding frame comprises:
a first filter cell; and
a first retainer comprising a first retaining pad coupled to a first shaft, wherein the first retaining pad and the first shaft are movable to secure and release a first filter in the first filter cell, the first retainer comprises a hinge coupled to the filter holding frame, and the first retaining pad and the first shaft are rotatable about a rotational axis of the hinge to secure and release the first filter in the first filter cell.

21. A system, comprising:
a filter holding frame configured to support a plurality of filters for a turbine engine, wherein the filter holding frame comprises:
a first filter cell; and
a first retainer comprising a first retaining pad coupled to a first shaft, wherein the first retaining pad and the first shaft are movable to secure and release a first filter in the first filter cell, and the first retaining pad is rotatably coupled to the first shaft via a non-threaded rotatable joint.

22. A system, comprising:
a filter holding frame configured to support a plurality of filters for a turbine engine, wherein the filter holding frame comprises:
a first filter cell; and
a first retainer comprising a first retaining pad coupled to a first shaft, wherein the first retaining pad and the first shaft are movable to secure and release a first filter in the first filter cell, and the first retainer is configured to secure at least a second filter in a second filter cell that is adjacent to the first filter cell.

23. A system, comprising:
a filter holding frame configured to support a plurality of filters for a turbine engine, wherein the filter holding frame comprises:
a first filter cell; and
a first retainer comprising a first retaining pad coupled to a first shaft, wherein the first retaining pad and the first shaft are movable to secure and release a first filter in the first filter cell, the first retainer includes a spring that biases the first retaining pad and the first shaft inward toward the first filter cell, the first retainer includes a bracket fixed at a position along the length of the first shaft, and the spring biases the bracket inward toward a second filter in a second filter cell.

24. A system, comprising:
a turbine filter retainer, comprising:
a shaft;
a retention pad coupled to the shaft and configured to secure a first filter in a first filter cell of a filter holding frame, wherein the shaft is a threaded shaft that is rotatable to move the shaft and the retention pad lengthwise along an axis of the shaft between a first position biased against the first filter in the first filter cell and a second withdrawn position retracted away from the first filter.

25. The system of claim 24, wherein the turbine filter retainer comprises a hinge, and the hinge is configured to rotate the shaft and the retention pad toward and away from the first filter in the first filter cell.

26. The system of claim 24, wherein the turbine filter retainer is configured to secure a second filter in a second filter cell of the filter holding frame.

* * * * *